E. DELAFOND.
MECHANICAL SEPARATION OF RUBBER FROM RUBBER BEARING PLANTS.
APPLICATION FILED JAN. 23, 1905.
920,279. Patented May 4, 1909.
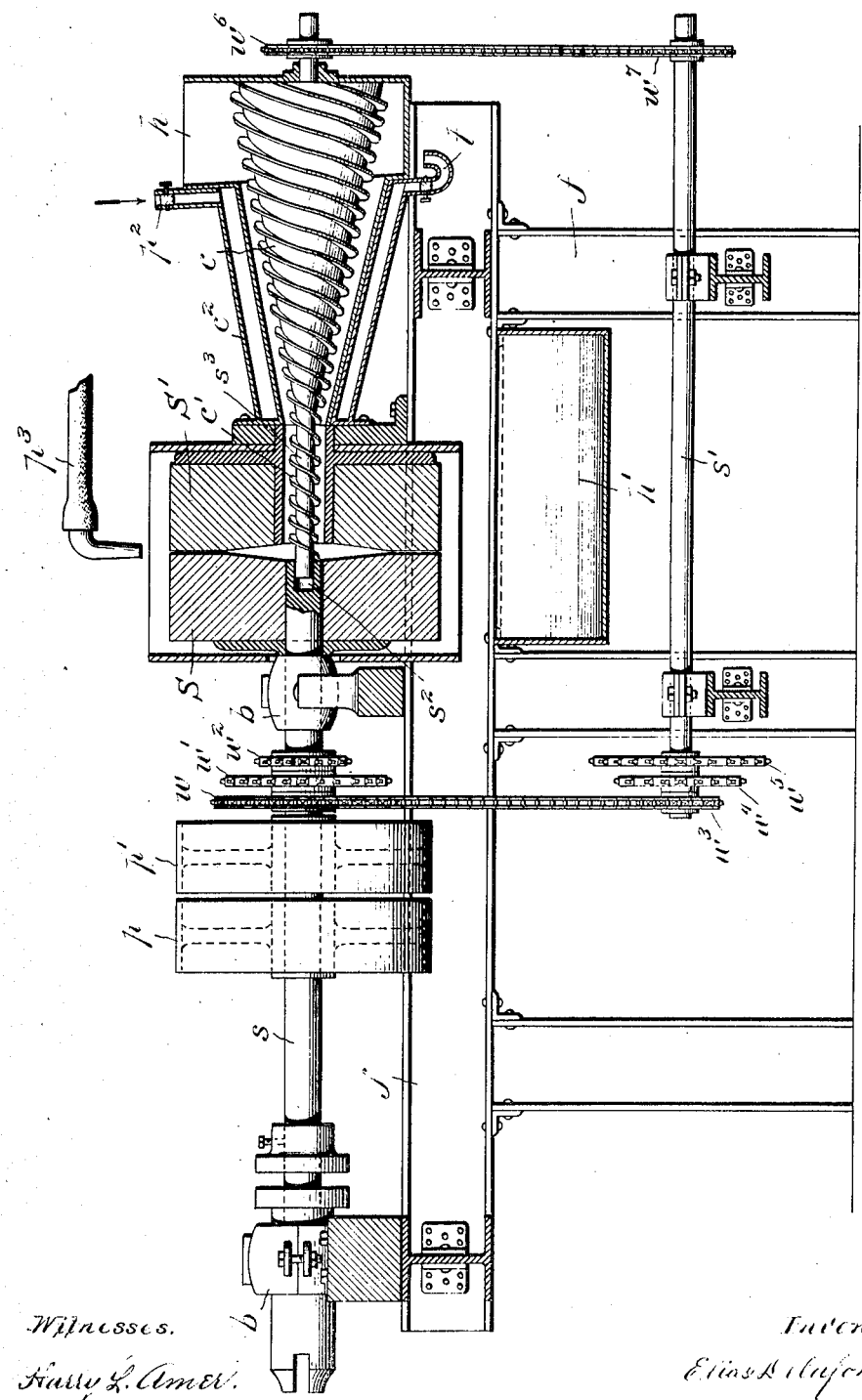

of the Patent Office.

UNITED STATES PATENT OFFICE.

ELIAS DELAFOND, OF MEXICO, MEXICO.

MECHANICAL SEPARATION OF RUBBER FROM RUBBER-BEARING PLANTS.

No. 920,279.	Specification of Letters Patent.	Patented May 4, 1909.

Application filed January 23, 1905. Serial No. 242,365.

*To all whom it may concern:*

Be it known that I, ELIAS DELAFOND, a citizen of the United States of America, residing at Mexico city, in the Republic of Mexico, have invented certain new and useful Improvements in Mechanical Separation of Rubber from Rubber-Bearing Plants; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention has relation to the extraction of rubber from so-called rubber plants other than those from which the rubber is obtained by tapping. There is quite a large variety of such plants having the character of shrubs, vines and bushes or small trees, from which the rubber has heretofore been extracted by chemical processes only, which are not only quite expensive as regards the cost of chemicals, but also involve a great deal of time and labor. Furthermore, the product of these processes can, as a rule, not be vulcanized without further special treatment, owing to the presence of resinous or gummy and fatty resinous constituents which are not vulcanizable. This is more especially true of rubber obtained from the *Parthenium Argentatum*, which contains a high percentage of non-vulcanizable substances referred to.

I have discovered that vulcanizable rubber can be obtained from all rubber bearing plants except perhaps from the *Parthenium Argentatum*, by purely mechanical means, and that the rubber obtained from the *Parthenium Argentatum* can be treated in a very simple manner so that it will readily vulcanize, and that the rubber obtained by mechanical means from any rubber bearing plant can by a simple further treatment be freed from foreign constituents in a very simple manner if it is desired to obtain what I may term an absolutely pure product, or so called "virgin rubber" for special purposes.

In carrying out my invention in so far as it relates to the mechanical extraction, or perhaps more properly, the mechanical separation of the rubber vesicles from the ligneous cellulose and other foreign constituents, I employ mechanism which, in its general character, is well known, though the product resulting from the operation of the mechanism differs radically from the products usually obtained therewith. But that my invention may be fully understood, I will describe the same in detail, reference being had to the accompanying drawing, which illustrates a suitable apparatus for effecting the mechanical separation of rubber from rubber bearing plants by a vertical longitudinal section.

In carrying out my invention the rubber plants are first ground or otherwise sufficiently reduced by any suitable mechanical appliances to adapt the reduced material to be fed to stones such as are commonly used in flour mills, to be reduced to flour, which is then fed to the same, or preferably to another similar mill, and preferably after being heated to some extent. This causes the rubber vesicles to dilate or expand and become quite elastic, while the greater part of the non-vulcanizable resins and gums are melted and absorbed by the ligneous and cellulose flour, and in this manner separated from the rubber vesicles. As the material passes between the stones the expanded rubber vesicles are subjected to pressure, friction and rolling, and not to a grinding action, as might be supposed, the vesicles being agglomerated and rolled, and are discharged from the stones in the form of small cylinders, or as I term them, sausages, while the ligneous and cellulose constituents charged with the non-vulcanizable resinous and gummy constituents are separated, the material being discharged onto a screen which retains the rubber cylinders only.

Although I prefer to heat the pulverulent material before feeding it to the stones, as it expedites the agglomeration of the rubber vesicles, this is not absolutely necessary.

The separation of the ligneous and non-vulcanizable resinous and gummy constituents from the rubber may be rendered more perfect and more expeditious by chilling and washing, whereby said non-vulcanizable resionous and gummy constituents become hard and more firmly attached to the ligneous constituents. This is accomplished by simply feeding cold water to the mill stones during their operation on the material. In this manner I obtain a final merchantable product which can be readily vulcanized, from all rubber bearing plants I have so far used in my process except the *Parthenium*

*Argentatum*, which contains a much greater percentage of non-vulcanizable resin and gum than any other rubber bearing plant I have so far used, namely about 25.10% of resin and 8.20% of fatty matter and fatty resins. To render this rubber product readily vulcanizable I treat it with a novel solvent, namely with fusel oil from the distilleries by kneading the rubber with the oil, I am thus enabled to readily eliminate the excess of the non-vulcanizable resinous and gummy constituents, having found that fusel oil answered the purpose better than any of the other many solvents I have tried. I have, however, also discovered that the rubber obtained mechanically as described from the *Parthenium Argentatum* can be vulcanized by increasing the percentage of sulfur by about 25% and by vulcanizing under a higher pressure, say four-and-a half atmospheres, instead of two, as usual.

If it is desired to obtain a pure final product, what I may term a virgin rubber, I treat the rubber product obtained mechanically as described with a mixture of fusel oil and of an alcoholic solution of a caustic alkali, as soda or potash, preferably soda, by triturating or kneading, for the purpose of removing the small remaining quantity of ligneous cellulose and non-vulcanizable resinous and gummy constituents. The fusel oil has a very peculiar action on the rubber, irrespective of its action as a powerful solvent of the non-vulcanizable resinous and gummy constituents, in that it protects the rubber, in a great measure, against becoming hard and brittle, while the alcoholic alkali solution saponifies the fatty constituents or fatty resins.

In practice I use about one liter either of fusel oil per kilo of rubber, when this alone is used or mixed with the alcoholic solution of a caustic alkali, the proportion of the latter in the solution varying in accordance with the proportion of fatty resins remaining in the mechanically obtained rubber. Of course it is well understood that both the alcohol and fusel oil can readily be recovered by well known means and used repeatedly.

Referring now to the accompanying drawing, $f$ indicates the frame of the machine provided with bearings $b$ for the mill driving shaft $s$ on which the revoluble stone S is secured and coöperates with the stationary stone S′. The shaft $s$ carries the usual fast and loose belt pulleys $p$, $p'$, and three sprocket wheels $w$, $w'$, $w^2$ of successively decreasing diameter adapted to be chained to sprocket wheels $w^3$, $w^4$, $w^5$ of successively increasing diameter and secured to a transmitting shaft $s'$, for the purpose of regulating the speed thereof, any suitable and well known means being also provided for adjusting the shaft $s$ longitudinally to regulate the distance between the grinding faces of the mill stones S and S′.

In the inner end of the driving shaft $s$ is formed a socket $s^2$ which serves as a bearing for one end of the shaft $s^3$ of a, preferably, conical screw-conveyer $c$, whose opposite end revolves in a bearing on a feed hopper $h$, which incloses the outer end of the conveyer, that portion thereof between said hopper and the stationary stone S′ being inclosed by a jacketed casing $c^2$ having steam supply pipe $p^2$ and a suitable steam trap $t$. The smaller end $c'$ of the conveyer $c$, extends through the stationary stone to feed the material to a central cavity between the stones, as usual.

To the outer end of the conveyer shaft is secured a sprocket wheel $w^6$ chained to a like wheel $w^7$ on the transmission shaft $s'$.

From the description of the machine its operation will be readily understood, the material being discharged into a discharge hopper $h'$ and from thence onto a screen, not shown, while water is admitted to the grinding faces of the stones through a pipe $p^3$.

As the finely ground heated material is fed to the stones the rubber vesicles are agglomerated by friction and pressure and rolled into small cylinders, in which form they leave the stones, while the ligneous and cellulose constituents together with the greater portion of the non-vulcanizable constituents hereinabove referred to are separated and washed away by the water.

Having thus described my invention, what I claim as new therein and desire to secure by Letters Patent, is:—

The method of extracting rubber from rubber bearing plants, which comprises grinding the entire dry or green plants, feeding the ground mass to grinding stones to agglomerate the rubber vesicles, and heating the ground mass as it is being fed to the stones to permit the ligneous substances to absorb the resins and supplying cold water to the heated ground mass during agglomeration to suddenly harden the resin soaked ligneous substances and assist their comminution, grinding and separating them from the agglomerated rubber vesicles.

In testimony that I claim the foregoing as my invention, I have signed my name in presence of two subscribing witnesses.

ELIAS DELAFOND.

Witnesses:
 JOHN H. MOORE,
 GRAHAM M. KER.